United States Patent
Young et al.

(10) Patent No.: US 10,476,044 B2
(45) Date of Patent: Nov. 12, 2019

(54) ALKALINE AND NON-AQUEOUS PROTON-CONDUCTING POUCH-CELL BATTERIES

(71) Applicant: Ovonic Battery Company, Inc., Rochester Hills, MI (US)

(72) Inventors: Kwo-hsiung Young, Troy, MI (US); Jean Nei, Southgate, MI (US); Tiejun Meng, Novi, MI (US)

(73) Assignee: Ovonic Battery Company, Inc., Rochester Hills, MI (US)

( * ) Notice: Subject to any disclaimer, the term of this patent is extended or adjusted under 35 U.S.C. 154(b) by 77 days.

(21) Appl. No.: 15/823,779

(22) Filed: Nov. 28, 2017

(65) Prior Publication Data

US 2018/0083233 A1    Mar. 22, 2018

Related U.S. Application Data

(62) Division of application No. 14/615,796, filed on Feb. 6, 2015, now Pat. No. 9,859,531.

(51) Int. Cl.
*H01M 2/02* (2006.01)
*H01M 4/24* (2006.01)
(Continued)

(52) U.S. Cl.
CPC ....... *H01M 2/0207* (2013.01); *H01M 2/0275* (2013.01); *H01M 4/242* (2013.01);
(Continued)

(58) Field of Classification Search
None
See application file for complete search history.

(56) References Cited

U.S. PATENT DOCUMENTS

| | | | |
|---|---|---|---|
| 4,687,714 A | 8/1987 | Oltman | |
| 5,096,667 A | 3/1992 | Fetchenko et al. | |

(Continued)

FOREIGN PATENT DOCUMENTS

| | | |
|---|---|---|
| CN | 104282848 | 1/2015 |
| EP | 1422767 | 5/2004 |
| WO | 2014153642 | 10/2014 |

OTHER PUBLICATIONS

IPRP of corresponding PCT Application No. PCT/US2016/016395 dated Aug. 17, 2017.

(Continued)

*Primary Examiner* — Eli S Mekhlin
(74) *Attorney, Agent, or Firm* — Dinsmore & Shohl LLP; Weston R. Gould

(57) ABSTRACT

Provided are sealed pouch-cell batteries that are alkaline batteries or non-aqueous proton-conducing batteries. A pouch cell includes a flexible housing such as is used for pouch cell construction where the housing is in the form of a pouch, a cathode comprising a cathode active material suitable for use in an alkaline battery, an anode comprising an anode active material suitable for use in an alkaline battery, an electrolyte that is optionally an alkaline or proton-conducting electrolyte, and wherein the pouch does not include or require a safety vent or other gas absorbing or releasing system. The batteries provided function contrary to the art recognized belief that such battery systems were impossible due to unacceptable gas production during cycling.

13 Claims, 5 Drawing Sheets

(51) Int. Cl.
*H01M 4/32* (2006.01)
*H01M 10/30* (2006.01)
*H01M 10/42* (2006.01)
*H01M 10/48* (2006.01)
*H01M 10/34* (2006.01)

(52) U.S. Cl.
CPC .............. *H01M 4/32* (2013.01); *H01M 10/30* (2013.01); *H01M 10/345* (2013.01); *H01M 10/425* (2013.01); *H01M 10/4257* (2013.01); *H01M 10/48* (2013.01); *H01M 2010/4271* (2013.01); *H01M 2300/0014* (2013.01)

(56) References Cited

U.S. PATENT DOCUMENTS

| | | | |
|---|---|---|---|
| 5,344,728 A | 9/1994 | Ovshinsky et al. | |
| 5,348,822 A | 9/1994 | Ovshinsky et al. | |
| 5,489,836 A | 2/1996 | Yuen | |
| 5,523,182 A * | 6/1996 | Ovshinsky | H01M 4/32 |
| | | | 429/223 |
| 5,536,591 A | 7/1996 | Fetchenko et al. | |
| 5,541,019 A * | 7/1996 | Anani | H01M 10/347 |
| | | | 429/222 |
| 5,558,950 A | 9/1996 | Ovshinsky et al. | |
| 5,567,549 A | 10/1996 | Ovshinsky et al. | |
| 5,569,563 A | 10/1996 | Ovshinsky et al. | |
| 5,773,956 A | 6/1998 | Wieczorek | |
| 5,998,966 A | 12/1999 | Gaza | |
| 6,027,834 A | 2/2000 | Hayashi et al. | |
| 6,048,638 A | 4/2000 | Pendalwar | |
| 6,210,498 B1 | 4/2001 | Ovshinsky et al. | |
| 6,265,100 B1 | 7/2001 | Saaski et al. | |
| 6,402,966 B1 | 6/2002 | Taira | |
| 6,522,148 B2 | 2/2003 | Ochiai et al. | |
| 6,707,273 B1 | 3/2004 | Gignac | |
| 7,211,541 B2 | 5/2007 | Fetcenko et al. | |
| 7,258,949 B2 | 8/2007 | Frederiksson et al. | |
| 7,344,676 B2 | 3/2008 | Young et al. | |
| 7,393,500 B2 | 7/2008 | Fetchenko et al. | |
| 7,404,842 B1 * | 7/2008 | Wainright | B22F 9/04 |
| | | | 75/351 |
| 7,776,468 B2 | 8/2010 | Richards et al. | |
| 8,012,621 B2 | 9/2011 | Joshi et al. | |
| 8,722,235 B2 | 5/2014 | Tucholski | |
| 8,877,378 B2 | 11/2014 | Young et al. | |
| 2002/0127362 A1 * | 9/2002 | Jansen | B32B 3/02 |
| | | | 428/40.1 |
| 2005/0153204 A1 | 7/2005 | Fierro et al. | |
| 2006/0073277 A1 | 4/2006 | Brehm et al. | |
| 2009/0029245 A1 | 1/2009 | Ibaragi et al. | |
| 2010/0040941 A1 | 2/2010 | Schubert | |
| 2012/0183835 A1 | 7/2012 | Young et al. | |
| 2013/0063074 A1 * | 3/2013 | Lin | H02J 7/0008 |
| | | | 320/107 |
| 2013/0337304 A1 | 12/2013 | Luski et al. | |
| 2014/0374651 A1 | 12/2014 | Young et al. | |

OTHER PUBLICATIONS

Srivastava, S. et al, "Investigations of Synthesis and Characterization of MmNi4,3Al0,3Mn0,4 and MmNi4,0Al0,3Mn0,4Si0,3, Hydrogen Storage Materials Through Thermal and Spin Melting Processes," Int. J. Hydrogen Energy, vol. 23, No. 1, pp. 7-13, 1998.

Fierro, C. et al, "The Influence of Nickel-Hydroxide Composition and Microstructure on the High-Temperature Performance of Nickel Metal Hydride Batteries," Journal of the Electrochemical Society, 153 (3) A492-A496 (2006).

Srivastava, S. et al, "Investigatios on synthesis, characterization and hydrogenation behaviour of the spin- and thermal-melted versions of LaNi5-xSix (x=0.1, 0.3, 0.5) hydrogen storage materials," Jurnal of Alloys and Compounds, 267 (1998) 240-245.

Young, K. et al, "Studies of off-stoichiometric Ab2 metal hydride alloy: Part 1. Structural Characteristics," International Journal of Hydrogen Energy, 36 (2011) 11137-11145.

Young, K. et al, "Studies of off-stoichiometric Ab2 metal hydride alloy: Part 2. Hydrogen Storage and electrochemical properties," International Journal of Hydrogen Energy, 36 (2011) 11146-11154.

Young, K. et al, "Gas atomizatio of Cu-modified AB5 metal hydride alloys," Journal of Alloys and Compounds 509 (2011) 4896-4904.

Young, K et al, "Studies on the hydrogen storage characteristic of La1—xCex (NiCoMnAlCuSiZr)5,7 with a B2 secondary phase," Journal of Alloys and Compounds 585 (2014) 760-770.

* cited by examiner

ALKALINE AND NON-AQUEOUS PROTON-CONDUCTING POUCH-CELL BATTERIES

CROSS REFERENCE TO RELATED APPLICATIONS

This application is a divisional of U.S. patent application Ser. No. 14/615,796 now U.S. Pat. No. 9,859,531, filed Feb. 6, 2015, the entire contents of which are incorporated herein by reference.

STATEMENT OF GOVERNMENT SPONSORSHIP

This invention was made with government support under contract no. DE-AR0000386, awarded by Advanced Research Projects Agency—Energy—U.S. Department of Energy under the robust affordable next generation EV-storage (RANGE) program. The government has certain rights in the invention.

FIELD OF THE INVENTION

This invention relates to batteries such as secondary batteries. In particular, the invention relates to alkaline batteries or non-aqueous proton-conducting batteries in the form of a pouch-cell that is capable of cycling without the need for a safety vent thereby providing increased energy density and design flexibility of batteries.

BACKGROUND

Certain metal hydride (MH) alloy materials are capable of absorbing and desorbing hydrogen. These materials can be used as hydrogen storage media, and/or as electrode materials for fuel cells and metal hydride batteries including nickel/metal hydride (Ni/MH) and metal hydride/air battery systems and Li-ion battery.

When an electrical potential is applied between the cathode and a MH anode in a MH cell, the negative electrode material (M) is charged by the electrochemical absorption of hydrogen to form a metal hydride (MH) and the electrochemical evolution of a hydroxyl ion. Upon discharge, the stored hydrogen is released to form a water molecule and evolve an electron. The reactions that take place at the positive electrode of a nickel MH cell are also reversible. Most MH cells use a nickel hydroxide positive electrode. The following charge and discharge reactions take place at a nickel hydroxide positive electrode.

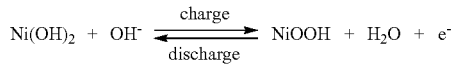

In a MH cell having a nickel hydroxide positive electrode and a hydrogen storage negative electrode, the electrodes are typically separated by a non-woven, felted, nylon or grafted polyethylene/polypropylene separator. The electrolyte is usually an alkaline aqueous electrolyte, for example, 20 to 45 weight percent potassium hydroxide.

A drawback of prior alkaline batteries, illustratively metal hydride batteries, is that they require hard shell casings so as to handle the pressure increases common to these cell types. The use of such cases or housings limits the shape and flexibility that the resulting batteries may exhibit. For example, the hard shell housings cannot be formed in the field to any desired curved shape as the hard housing prevents shape change. Similarly, the hard shell housings of prior alkaline batteries suffer from excess weight relative to their lithium ion pouch-cell counterparts. It was believed in the art that it was not possible to form a pouch cell housing for an alkaline battery as during cycling the active materials would produce gas due to the competing reactions at both the cathode and anode. For example, during charging the anode in a metal hydride cell exhibits the following competing reactions:

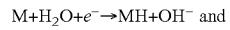

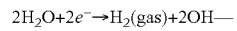

Similarly, during charging a cathode in an nickel hydroxide alkaline cell exhibits the following competing reactions:

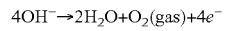

Thus, the near-complete charging process in prior cells produces a significant amount of oxygen or hydrogen gas that would result in bursting the flexible housing of a pouch-cell with no safety vent valve.

As will be explained hereinbelow, the inventors have found that in practice an alkaline pouch cell battery is not only possible, but does not suffer from the limitations believed to be an issue in the field. These and other advantages of the invention will be apparent from the drawings, discussion, and description which follow.

SUMMARY

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

The use of flexible housing battery systems known as pouch-cell batteries are susceptible to breach due to excess development of gas caused by unwanted side reactions in the electrolyte active materials. Contrary to art expectations, the inventors and found that pouch-cell construction is possible for alkaline or non-aqueous proton conducting batteries without the need for a safety vent or other gas discharge system during cycling.

As such, it is a first objective of the invention to provide alkaline or non-aqueous proton conducting batteries in pouch-cell configuration by packaging the necessary electrode materials and electrolyte in a flexible housing such as those normally used for construction of other types of pouch-cell batteries.

A sealed pouch-cell alkaline battery is provided that includes: a flexible housing in the form of a sealed pouch; a cathode comprising a cathode active material suitable for use in an alkaline battery; an anode comprising an anode active material suitable for use in an alkaline battery; an alkaline electrolyte; where the pouch is absent a safety vent or other gas discharge or absorbing system, and wherein the cathode active material and the anode active material do not increase internal atmospheric pressure more than 2 psig during cycling. A housing optionally has an average thickness of 0.01 mm to 0.2 mm. The batteries are operable as primary or secondary batteries. In some aspects, the battery optionally further includes a battery protection circuit capable of measuring the rate of change of battery voltage with respect to time, battery temperature, or both. The battery protection circuit is optionally capable of electronic control over state-of-charge and charge rate/discharge rate. Optionally, the battery protection circuit further comprises a memory device capable of recording state of charge. Optionally, the battery protection circuit is capable of terminating the charge process when a charge state is equal to or greater than 90% state of charge. In any of the foregoing configurations, the anode active material optionally has a PCT plateau pressure of 0.8 atmospheres or less measured at 50% of the maximum storage capacity and 30° C. In some aspects the anode active material has a heat of hydride formation less than −35 kJ/mol $H_2$. An anode active material optionally includes an alloy that is annealed. Optionally, an anode active material is a metal hydride alloy capable of storing hydrogen electrochemically. Optionally, a cathode active material or anode active material includes a nickel hydroxide based disordered material. Optionally, the disordered materials are disordered both structurally and compositionally. A cathode active material optionally has a voltage gap of 0.09 volts or greater. A battery includes an electrolyte, optionally an alkaline electrolyte that includes 20 to 45 weight percent KOH or NaOH in water. It is appreciated that any of the forgoing aspects are interchangeable in many possible configurations.

Also provided are sealed pouch-cell batteries that include: a flexible housing in the form of a sealed pouch; a cathode comprising a cathode active material capable of reversibly absorbing a hydrogen ion; an anode comprising an anode active material capable of reversibly absorbing a hydrogen ion; an proton or hydroxyl ion conducting electrolyte; where the cathode, anode, and electrolyte housed within the pouch wherein said electrolyte is in chemical contact with both said cathode and said anode active material, where the pouch is absent a safety vent or other gas discharge or absorbing system, and optionally wherein the cathode active material and the anode active material do not increase internal atmospheric pressure more than 2 psig during cycling. A housing optionally has an average thickness of 0.01 mm to 0.2 mm. The batteries are operable as primary or secondary batteries. In some aspects, the battery optionally further includes a battery protection circuit capable of measuring the rate of change of battery voltage with respect to time, battery temperature, or both. The battery protection circuit is optionally capable of electronic control over state-of-charge and charge rate/discharge rate. Optionally, the battery protection circuit further comprises a memory device capable of recording state of charge. Optionally, the battery protection circuit is capable of terminating the charge process when a charge state is equal to or greater than 90% state of charge. In any of the foregoing configurations, the anode active material optionally has a PCT plateau pressure of 0.8 atmospheres or less measured at 50% of the maximum storage capacity and 30° C. In some aspects the anode active material has a heat of hydride formation less than −35 kJ/mol $H_2$. An anode active material optionally includes an alloy that is annealed. Optionally, an anode active material is a metal hydride alloy capable of storing hydrogen electrochemically. Optionally, a cathode active material or anode active material includes a nickel hydroxide based disordered material. Optionally, the disordered materials are disordered both structurally and compositionally. A cathode active material optionally has a voltage gap of 0.09 volts or greater. A battery includes an electrolyte, optionally an electrolyte that includes is a polymer or solid separator/electrolyte. It is appreciated that any of the forgoing aspects are interchangeable in many possible configurations.

The provided sealed pouch-cell batteries for the first time demonstrate the ability of such battery construction to be functional and commercially viable for alkaline or non-aqueous proton conducing configurations.

BRIEF DESCRIPTION

Figure 1A:
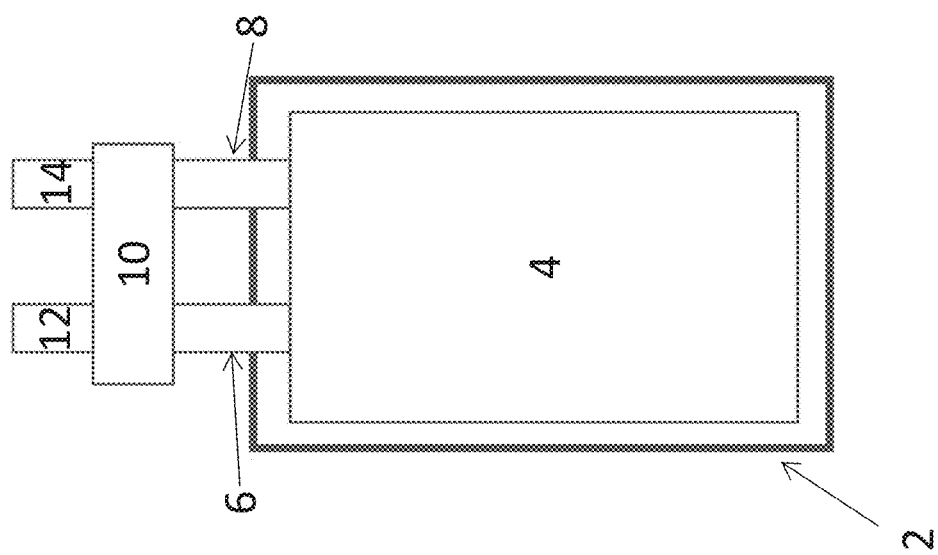
FIG. 1A illustrates a pouch-cell according to one aspect as viewed face on to the electrode surface area.

The following description is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

Scientific and technical terms used herein are intended to have the meanings commonly understood by those of ordinary skill in the art unless otherwise defined herein.

For purposes of this disclosure the terms "batteries" and "cells" will be used interchangeably when referring to one electrochemical cell, although the term "battery" can also be used to refer to a plurality of electrically interconnected cells.

As defined herein, an "anode" includes a material that acts as an electron acceptor during charge.

As defined herein, a "cathode" includes a material that acts as an electron donor during charge.

As defined herein, the term "disordered" means of predominantly non-uniform composition or structure. Disorder can refer to random or non-random, and non-uniform composition or structure. The term "compositionally disordered" is understood as a random or non-random, and non-uniform arrangement of elements in the overall composition. The term "structurally disordered" is understood as a random or non-random, and non-uniform arrangement of crystal or other macrostructure in the overall composition such as a non-uniform distribution of phases in the crystal structure. An example of a non-uniform distribution of phases in a crystal structure can be 1, 2, 3, or 4 $AB_5$ layers in between $A_2B_4$ slabs.

The term "predominant" is defined as the greatest amount relative to other comparative elements or materials.

As defined herein, the term "chemical contact" means that the electrolyte is in sufficient physical contact with the cathode and the anode that ions may be transferred from the electrolyte to the cathode, the anode, or both either directly or through a separator or other divider.

As used herein the term "flexible" when referring to a battery housing is defined as being capable of shape change with no more than hand force to produce the shape change. For example, paper and metal foil are flexible. Sheet metal and solid plastics used for container purposes where the container or material is intended to maintain its shape are not considered flexible. A specific example of materials that are considered flexible are sold by MTI Corporation with a product number EQ-alf-400-7.5M. This laminated multi-layer product is composed of polyamide (0.025 mm thick), aluminum foil (0.040 mm thick), polypropylene (0.040 mm thick) and polyester-polyurethane and urethane-free adhesives with a final thickness of 0.115 mm.

As used herein the term "sealed" is defined as sequestering an internal space from an external space such that air, fluid, or other gases or liquids are unable to penetrate the inner space from the outer space or penetrate from the inner space to the outer space absent a failure, puncture, or other breach of the seal.

Provided are pouch-cells made with flexible housing that for the first time employ metal hydride or other electrodes active materials suitable for use in an alkaline or other hydroxyl or proton conducting electrolyte. The pouch-cell alkaline batteries as provided successfully employ a metal hydride based or other alkaline suitable electrode system that for the first time is capable of functioning without the need for a safety vent to release gas that was expected in the art to be generated at such a high degree so as to make such pouch-cells impossible. The inventors discovered that, contrary to the art held belief, a metal hydride or other alkaline based cell system is possible to include in a pouch-cell configuration absent a safety vent. Such cells have numerous advantages and utility such as for powering electronic devices, storage of energy, or other use in a configuration that has higher gravimetric and volumetric energy relative to other rigid cell structures, higher packing density, relatively simple fabrication and lower cost, the ability to use the electrodes in a flood state, and flexible in the design of size and shape, even bendable as desired by the intended use or user. These advantages were long sought after in the art of alkaline based or metal hydride based cell systems, but originally thought impossible.

As such, provided are sealed pouch-cell alkaline or non-aqueous proton-conducting batteries. In some aspects, a sealed pouch-cell alkaline or non-aqueous proton-conducting battery includes: a flexible housing in the form of a sealed pouch; a cathode including a cathode active material suitable for use in an alkaline or non-aqueous proton-conducting battery; an anode including an anode active material suitable for use in an alkaline or non-aqueous proton-conducting battery; an electrolyte, optionally an alkaline or other hydroxyl ion or proton conducting electrolyte in liquid, gel or solid form; wherein the cathode, anode, and electrolyte housed within the pouch, and the pouch is optionally absent a safety vent.

A pouch-cell battery as provided is optionally a primary battery or a secondary battery. A primary battery is one that is chemically or structurally formed so as to be capable of a single discharge and cannot be renewed or recharged. A secondary battery is one that is capable of more than one cycle, optionally 100, 200, 300, 400, 500, or more cycles while maintaining a capacity of 50% or greater that at cycle 2.

A pouch-cell is characterized by a flexible housing in the form of a sealed pouch and not requiring or totally absent a rigid or other structurally limiting material used as the housing for the electrode assembly. As such, a pouch-cell optionally excludes a rigid metallic or polymeric case such as those traditionally used in the art or as optionally described in U.S. Pat. Nos. 6,027,834, 6,265,100, or other rigid configurations known in the art. An illustrative example of a pouch-cell according to some aspects is found in FIG. 1A and FIG. 1B. FIG. 1A illustrates a pouch-cell design that includes a flexible housing 2 that substantially surrounds and seals in an electrode assembly 4 shown in top face view. The electrode assembly 4 includes an anode, a cathode, a separator, and electrolyte, as well as any necessary connective materials. The flexible housing 2 forms a sealed interior environment for an electrode assembly 4. A pouch-cell also includes a negative current collector 6 connected to one or more anode sheets of the cell, and a positive current collector 8 connected to one or more cathode sheets of the cell. The current collectors 6, 8 may be welded to the electrode by a method of welding that includes, but is not limited to, resistance welding, laser welding, electron beam welding, or ultrasonic welding. In some aspects, the negative current collector 6, and the positive current collector 8, are each electrically connected to a control electronic system 10 that includes a battery protection circuit such that the control electronics are integral to the battery. Also, electrically connected to the control electronics 10 are a negative outside lead 12 and a positive outside lead 14, to enable electrical connection of the battery to a circuit or other portion of a device to charge or be powered by the battery.

Figure 1B:
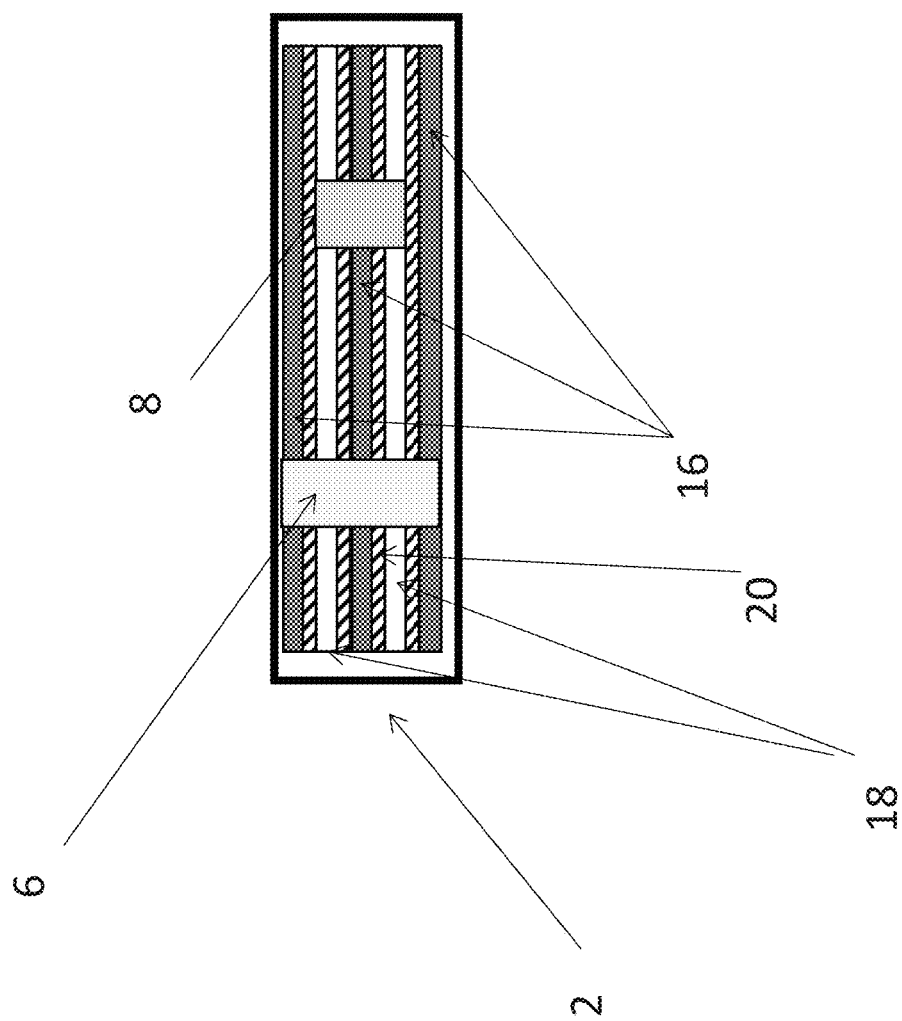
FIG. 1B illustrates a pouch-cell according to one aspect as viewed side on to the electrode surface area.

FIG. 1B is an illustrative depiction of a pouch-cell battery according to some aspects from a side view illustrating the stacking arrangement of anode sheets 16 and cathode sheets 18 packed inside a flexible housing 2. The number of anode sheets and cathode sheets is not limited in some aspects and a cell may include 1, 2, 3, 4, 5, 6, 7, 8, or more of each. The number of cathode sheets need not be equivalent to the number of anode sheets, but the number of each may optionally be equal. In some aspects the number of anodes exceeds the number of cathodes. In some aspects, the number of cathodes exceeds the number of anodes. Separating the cathode sheets 18 and anode sheets 16 are optionally one or more separators 20. A negative current collector 6 and a positive current collector 8 are electrically attached to the anode and cathode sheets respectively.

A pouch-cell battery includes a flexible housing. A flexible housing is optionally a metal foil that may or may not be lined with a polymer such as plastic. The flexible housing material is formed into a pouch as is known in the art. A housing is of any suitable shape, for example, tubular, prismatic, square, rectangular, oval, circular, triangular and hexagonal. A housing is generally made of one or more materials that are in the form of an impermeable (to water, oxygen, air and electrolyte solvent) flexible sheet material such as a (metalized) foil or a laminated structure optionally including a (metalized) foil. (See for example: EP 1422767; U.S. Pat. No. 6,042,966; US 2006/073277; and US 2009/0029245). In some aspects, a sheet material suitable for use in a housing is described in US 2009/0029245 comprising a stainless steel foil of thickness between 10 μm and 200 μm. Considering the weight, Al foil is useful as a basic pouch material.

A housing is made from a material that is optionally in a film or layers of film to form a thin material that is not rigid. A housing optionally has an overall average thickness (dimension 90 degrees to the cross sectional area) of 0.01 mm to 0.2 mm, or any value or range therebetween. Optionally, a housing has a thickness of 0.05 to 2 mm, optionally 0.05 to 1.5 mm, optionally 0.05 to 1.25 mm, optionally 0.1 to 0.2 mm, optionally 0.1 to 0.15 mm. An illustrative example of a housing material is sold by MTI Corporation with a product number EQ-alf-400-7.5M. This laminated multi-layer product is composed of polyamide (0.025 mm thick), aluminum foil (0.040 mm thick), polypropylene (0.040 mm thick) and polyester-polyurethane and urethane-free adhesives with a final thickness of 0.115 mm. In some aspect, the combination of the materials chosen and the thickness of the housing material provides a flexible housing system.

A housing is optionally formed from a single sheet of material that is folded and contacting edges are secured together to form a seal by processes known in the art, illustratively by welding. In some aspects, a housing is formed from two or more sheets of material brought together with the edges secured together to form a seal. A negative current collector and a positive current collector are optionally directed to pass through a welded seam.

It is common for prior pouch-cells to include a safety vent to allow gas to escape. It is appreciated, however, that the current pouch-cells exclude such a safety vent in a housing. As such, in some aspects a pouch-cell excludes a resealable port or non-resealable port (safety vent) (generally an integrally formed portion of the flexible shell) configured for evacuation of gas from inside the pouch. In some aspects, a pouch-cell excludes both a safety vent or other method of absorbing gas such as porous structure, additional space to accommodate gas production, or other method as is known in the art.

In some aspects, a pouch-cell that excludes a safety vent demonstrates no increase in internal atmospheric pressure beyond 2 psig during cycling. The art believed that the electrode active materials used in the present pouch-cell batteries as provided herein would produce significant gas that would readily increase the internal atmospheric pressure within the pouch making such a configuration impossible. The present pouch-cells, however, do not increase internal atmospheric pressure significantly relative to the internal cell atmospheric pressure at cycle zero, optionally to no greater than 2 psig, optionally 1.9 psig, 1.8 psig, 1.7 psig, 1.6 psig, 1.5 psig, 1.4 psig, 1.3 psig, 1.2 psig, 1.1 psig, 1.0 psig, 0.9 psig, 0.8 psig, 0.7 psig, 0.6 psig, 0.5 psig, 0.4 psig, 0.3 psig, 0.2 psig, 0.1 psig, or 0 psig. Such raises in internal atmospheric pressure are believed to be independent of whether the cell is initially evacuated (cycle zero internal atmospheric pressure less than one atm) or not.

A pouch cell battery is optionally an alkaline battery or other battery that uses a proton or hydroxyl ion conducting electrolyte. Such systems employ anode(s) that include an anode active material suitable for use in such systems and a cathode including a cathode active material suitable for use in such systems. "Suitable for use" means is effective in storage or production of energy chemically using such electrolytes.

A pouch-cell optionally includes a cathode with a cathode active material suitable for use in a primary battery or a secondary battery. Illustrative examples of cathode active materials include those having a voltage gap of 0.09 V or greater when measured at 25° C. In some aspects, a cathode active material has a voltage gap that is optionally 0.091 V, 0.092 V, 0.093 V, 0.094 V, 0.095 V, 0.096 V, 0.097 V, 0.098 V, 0.099 V, or greater.

In some aspects, a cathode active material includes or is a hydroxide. Illustratively, a metal hydroxide such as nickel hydroxide is used or included in a cathode active material. A metal hydroxide is optionally an alloy of 1 to 5 transition metal elements. A cathode active material is optionally nickel hydroxide based. The term "nickel hydroxide based" is defined herein as including a nickel hydroxide as the predominant cathode electrochemically active material. In some aspects, a nickel hydroxide based material used in a cathode is solely $Ni(OH)_2$ as the active material. Such cathode active materials are commercially available as recognized in the art. Illustrative examples of cathode active materials can be found in U.S. Pat. Nos. 5,344,728 and 5,348,822 (which describe stabilized disordered positive electrode materials) and U.S. Pat. Nos. 5,569,563 and 5,567,549.

A cathode active material optionally includes one or more transition metal elements. Illustrative examples of a transition metal element included in a cathode active material include Ni, Co, Mn, Zn, Al, among others. Optionally, one or more additives are provided. An additive used in a Ni-based cathode active material is optionally Ca, Mg, Y, Al, Ba, Co, Cr, Cu, F, Fe, K, Li, Mn, Na, Sr, Zn, one or more lanthanides, among others. In some aspects, a cathode active material is a hydroxide of Ni, Co, and Zn alone or along with additives, optionally Ca or Mg. Optionally, a cathode active material is $Ni_{91}Co_7Zn_{0.5}Ca_1Mg_{0.5}$. Illustrative examples of cathode active materials and their methods of manufacture can be found in Fierro et al, *Journal of The Electrochemical Society*, 153(3), A492-A496 (2006). Other examples of cathode active material may be found in U.S. Pat. No. 5,348,822 and U.S. Application Publication No: 2005/0153204.

A pouch-cell includes an anode with an anode active material. An anode active material is suitable for use in an alkaline or non-aqueous proton-conducting battery. In some aspects, an anode active material is capable of storing hydrogen electrochemically. Storing hydrogen electrochemically is understood as being capable of reversibly absorbing and desorbing hydrogen. It was unexpectedly discovered that in some aspects when utilizing an anode active material with a relatively low hydrogen equilibrium pressure (e.g. at or less than 0.8 atm plateau pressure defined as pressure measured at 50% of the maximum hydrogen storage capacity), that a pouch-cell becomes possible as the gas produced as an unwanted side reaction becomes minimal or non-existent at expected operating temperatures and pressures. As such, an anode active material optionally has a PCT plateau pressure of 0.8 atmospheres or less at 30° C. In some aspects, an anode active material has a PCT plateau pressure in atmospheres of at or less than 0.8, 0.75, 0.7, 0.65, 0.6, 0.55, 0.50, 0.45, 0.40, 0.35, 0.30, 0.25, 0.20, 0.15, 0.14, 0.13, 0.12, 0.11, 0.10, 0.09, 0.08, 0.07, 0.06, 0.05, 0.04, 0.03, 0.02, 0.01 atmospheres at 30° C. Optionally, an anode active material has a PCT plateau pressure of 0.01 to 0.8 atmospheres at 30° C., or any value or range therebetween. Optionally, an anode active material has a PCT plateau pressure of 0.01 to 0.3 atmospheres at 30° C., optionally 0.05 to 0.3 atmospheres at 30° C.

An anode active material is optionally tailored compositionally to include a low hydrogen equilibrium pressure of 0.8 atmospheres or less by the inclusion of varying amounts of elements in the A crystallite site. One particular group of MH materials having utility in pouch-cell battery systems is known as the $AB_x$ class of materials. Illustrative examples of $AB_x$ type materials are disclosed, for example, in U.S. Pat. Nos. 5,536,591, 6,210,498, 7,211,541, 7,344,676, 7,393,500, 8,877,378, U.S. Patent Application Publication No: 2014-0374651, and U.S. patent application Ser. No. 14/340,913. Optionally, an anode active material has a chemical composition of $AB_2$, $A_2B_7$, or $AB_5$, among others. By using elements in various positions in the unit cell to increase its size, the alloy of the anode active material can be driven to a hydrogen equilibrium pressure of 0.8 atmospheres or less as measured by PCT at 50% of the maximum storage capacity and 30° C. For example, when examining $AB_5$ alloys the use of larger atomic size elements such as La or Zr in the A position and/or smaller atomic size elements in the B position such as Ce and Ti, result in the unit cell volume being relatively increased thereby decreasing the hydrogen equilibrium pressure plateau level.

Similarly, adjusting the stoichiometry to drive the relative amount of B lower by reducing X will increase the unit cell lattice size thereby lowering the hydrogen equilibrium pressure plateau. For example, alloys of composition $AB_{4.8}$, $AB_{4.9}$, or a $CaCu_5$ crystal structure will have lower plateau pressure than the $AB_{5.0}$ alloy.

An anode active material as used in a pouch-cell according to some aspects optionally includes a hydride forming metal component (A). A hydride forming metal component is optionally lanthanum, cerium, praseodymium, neodymium, promethium, samarium, yttrium, or combinations thereof or other metal(s) such as a mischmetal. In some aspects, a hydride forming metal component includes neodymium. A B component optionally includes a metal selected from the group of aluminum, nickel, cobalt, copper, and manganese, or combinations thereof. In some aspects, a B component includes nickel. The A component, the B component, or both may be partially substituted by one or more elements that may be titanium, zirconium, vanadium, chromium, cobalt, aluminum, or combinations thereof optionally together with modifier elements which may include silicon, tin, molybdenum, yttrium, antimony, or combinations thereof. In particular aspects, an A component includes neodymium and a B component includes nickel.

In some aspects, an anode active material includes three or more transition metals that are optionally disordered within the structure of the alloy material. Illustrative examples of a transition metal that may be included in an anode active material are Ti, V, Cr, Mn, Fe, Co, Ni, Cu, Zn, Ag, Au, Cd, or combinations thereof. In some aspects, a transition metal includes Cd, Ni, Co, Fe, Zn, Mn, or combinations thereof. Optionally, a single transition metal is present as a predominant. Optionally, an anode active material optionally includes a first transition metal as a predominant and a second transition metal at an atomic percentage of 5% or greater. A second transition metal is optionally present at an atomic percentage of at or greater than 5%, 6%, 7%, 8%, 9%, 10%, 11%, 12%, 13%, 14%, 15%, or greater. In some aspects, an anode active material optionally includes a nickel hydroxide based disordered material where nickel hydroxide based means predominantly nickel hydroxide.

An anode active material optionally includes one or more additive materials. An additive material is optionally included in an A component, a B component, or both. Optionally, an additive is magnesium. The presence of magnesium, for example, at a carefully selected level will promote a disordered crystal structure of the alloy. Optionally, magnesium is present at a level of 1 to 10 atomic percent in the overall composition. Optionally, magnesium is present at less than 3.3 atomic percent. Magnesium is optionally present at less than 10, 9, 8, 7, 6, 5, 4, 3.2, 3.1, 3, 2.9, 2.8, 2.7, 2.6, 2.5, 2.4, 2.3, 2.2, 2.1, 2, 1.9, 1.8, 1.7, 1.6, 1.5, or 1 atomic percent. Optionally, the level of magnesium is from 1 to 3 atomic percent. In some aspects, the level of magnesium is from 2.5 to 2.8 atomic percentage. Some aspects include magnesium as an additive in an A component, at an overall amount of 1 to 3 atomic percent, optionally 2.5 to 2.8 atomic percentage relative to the composition overall.

An anode active material optionally is formed of more than one phase. Optionally, an anode active material includes a primary phase and one or more secondary phases. A primary phase is a material phase that is present as a predominant in the overall alloy. In some aspects, a primary phase is represented by an $A_2B_7$ phase. One or more secondary phases are optionally also present in an anode active material. Optionally, the number of secondary phases is 1, 2, 3, 4, 5, 6, 7, or more. At least one secondary phase optionally contributes to the electrochemical performance of an anode active material. In some aspects, an electrochemically active secondary phase is an $AB_5$ phase. By contributing to the electrochemical performance of an alloy, a secondary phase is electrochemically active and may function synergistically with a primary phase to improve one or more measures of electrochemical performance relative to a system that is absent the secondary phase at the active level. One exemplary measure of electrochemical performance is improved HRD relative to a material that is absent such a secondary phase at an active level.

An electrochemically active secondary phase is optionally present at a phase abundance of 2% to 8% in the material, or any value or range therebetween. Optionally, a secondary phase is present at a level of 2% to 6%. Optionally, a secondary phase is present at a phase abundance percent level of 2, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, or 6.

An anode active material is optionally disordered, optionally with irregular stacking along the c-axis. Such an arrangement may be represented by an average crystallite size along the ab-plane that is larger than along the c-axis. Optionally, the average crystallite size along the ab-plane is at least 40% larger than along the c-axis. Optionally, the average crystallite size along the ab-plane is at least 40%, 45%, 50%, 55%, 60%, 65%, 70%, 75%, 80%, 85%, 90%, 95%, 100%, 105%, 110%, 115%, or 120% larger than along the c-axis.

An anode active material is optionally tailored by post-formation processing to include a low hydrogen equilibrium pressure of 0.8 atmospheres or less measured by PCT at 30° C. Post-formation processing optionally includes annealing, or by a melt-spin process such as that described by Srivastava and Srivastava, *Journal of Alloys and Compounds*, 1998; 267:240-245.

In examples of annealing, an ingot is prepared by methods well recognized in the art such as by the combination of raw materials that are melted by high-frequency induction. Optionally, an ingot of a hydride forming metal as an A component, a B component, and optionally one or more additives or modifier elements, are annealed at an annealing temperature of, for example, 900° C. or greater for an annealing time to produce the resulting anode active material or portion thereof. An annealing temperature used in a process is 900° C. or greater. Optionally, an annealing temperature is from 925° C. to 950° C. Optionally, an annealing temp is 925, 930, 935, 940, 945, or 950° C. An annealing temperature is applied to an ingot for an annealing time. At an annealing temperature of 925° C. to 950° C., an annealing time is optionally from 3 hours to 15 hours, or any value or range therebetween. Optionally, an annealing time is from 4 hours to 10 hours. Optionally, an annealing time is from 4 hours to 6 hours. Optionally, an annealing time is 3, 4, 5, 6, 7, 8, 9, 10, 11, 12, 13, 14, or 15 hours.

An anode active material is optionally formed by a melt-spin process. An exemplary melt-spin process is achieved by mixing and pelletizing a combination of raw materials in stoichiometric ratio, and then melting the mixture in a radio frequency induction furnace in an argon atmosphere. Ingots are then subjected to rapid solidification by pouring alloy material on a copper wheel rotating at a speed of approximately 5000 rpm, leading to cooling rates of $10^2$ to $10^3$ $K^{-1}S^{-1}$.

An anode active material is optionally characterized by a heat of hydride formation of between −15 kJ/mol and −40 kJ/mol $H_2$, or any value or range therebetween. In some aspects, the heat of hydride formation is between −35 kJ/mol and −40 kJ/mol $H_2$. Optionally, the heat of hydride formation is at or less than −35 kJ/mol, −36 kJ/mol, −37 kJ/mol, or −38 kJ/mol. It is appreciated that the ΔH can be calculated using the models and equations of Van Mal et al, *J. Less Common Metals*, 1974; 35:65 and Pasturel et al. *J. Less Common Metals*, 1982; 84:73. Other methods known in the art may be similarly used.

An anode active material or a cathode active material may be formed by a mechanical alloying processes such as ball milling, impact milling, attritor milling, and the like, which may be utilized to at least partially alloy the particles mechanically. In some aspects, an active material is formed into an ingot by induction melting and subjecting the ingot to annealing in an inert gas such as argon. An anode or cathode active material is optionally formed by a co-precipitation process such as that described in U.S. Patent Application Publication No: 2012/0009476.

An anode or a cathode may be formed by intermixing a major amount of an active powder material and an optional minor amount of a binder material such as a synthetic resin powder or the like (optionally at 1-10% by weight of solvent) in a solvent to prepare a slurry and applying the resulting slurry to a substrate followed by drying and optionally pressing. Exemplary binders include, but are not limited to, polyvinyl alcohol, carboxymethyl cellulose, hydroxypropyl cellulose, diacetyl cellulose, polyvinyl chloride, carboxylated polyvinyl chloride, polyvinyl fluoride, and a polymer having ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, and nylon. Examples of solvent include carbonate-based, ester-based, ether-based, ketone-based, alcohol-based, or aprotic solvents. Illustrative solvents include SMEO, N-methylpyrrolidone (NMP), ethylene glycol and water.

The mixture can also include a thickener, such as an aqueous solution of carboxymethylcellulose (CMC) or the like, to form a paste. In some aspects, a conduction promoter is included in an electrode active material, optionally copper.

A paste of active material may be layered or pressed upon an electrochemically conductive substrate optionally in the form of a plate or sheet, optionally porous, and optionally made of nickel or nickel-plated steel, copper, aluminum, or combinations thereof. The substrate can be a punched or perforated sheet, an expanded plate, screen, or the like. After the active material is contacted to the substrate, the resulting anode or cathode may be sintered. The form of a porous metal substrate optionally includes, but is not limited to, mesh, grid, matte, foil, foam, plate, and expanded metal. Optionally, the porous metal substrate is foam. In some aspects, a porous metal substrate is formed from copper, copper-plated nickel, or a copper-nickel alloy. To protect the porous metal substrate of the from the harsh battery environment, the porous metal substrate may be plated with a material which is electrically conductive yet resistant to corrosion in the battery environment. In some aspects, the porous metal substrate may be plated with nickel.

The conductivity of the electrode can also be increased by copper plating after the active material has been compressed (and possibly sintered) onto the substrate. The copper plating may be patterned or unpatterned. As well as increasing electrode conductivity, the copper plating provides an additional means of ensuring that the active material remains adhered to the substrate.

A pouch-cell battery includes an electrolyte. An electrolyte is optionally an electrolyte capable of and/or used for conducting protons or hydroxyl ions. An electrolyte is optionally an alkaline electrolyte. An electrolyte is optionally a liquid electrolyte or a solid electrolyte. In some aspects, an electrolyte is a gel or solid electrolyte. An electrolyte may be a non-aqueous electrolyte meaning that the electrolyte does not contain a significant amount of water where "significant amount" is recognized in the art. An electrolyte is optionally a solid electrolyte such as in the form of a polymer or gel. In this context, the polymer electrolyte may be either a true polymer, or the polymer may be plasticized or gelled with the addition of at least one low molecular weight organic liquid.

An electrolyte is optionally a liquid electrolyte, optionally an alkaline electrolyte. Illustrative examples of electrolytes are KOH, NaOH, LiOH, $Ca(OH)_2$, among others, in any suitable concentration, optionally 20 to 45 weight percent in water.

An electrolyte is optionally a solid polymer electrolyte that is either aqueous or non-aqueous. An illustrative example of such a polymer electrolyte is formed from poly(ethylene oxide), potassium hydroxide, and water. Other polymeric materials useful for the formation of alkaline electrolytes include poly(ethylene oxide), poly(vinyl alcohol), poly(acrylic acid), or a copolymer of epichlorohydrin and ethylene oxide each with KOH or NaOH.

Other examples of electrolytes include organic solutions (e.g. propylene carbonate (PC), ethylene carbonate (EC), dimethylformamide (DMF), dimethyl sulfoxide (DMSO), or Polyvinyl alcohol (PVA)) with added acid, protic ionic liquids (e.g. diethylmethylammonium trifluoromethanesulfonate (DEMA TfO), triethylamine: methylsulfonic acid ([Et3N][MsOH]), 2-methylpyridine:trifluromethanesulfonic acid (1:2), or 1-ethyl-3-methylimmidazolium dicyanamide (EMI-DCA)), aprotic ionic liquids with acid added, among others known in the art.

An electrolyte is optionally a protic ionic liquid. A protic ionic liquid electrolyte is formed from proton transfer from a Bronsted acid to a Bronsted base. Illustrative examples of such electrolyte materials include those found in international patent application publication WO 2014153642. In the case of DEMA-TfO pair, DEMA is an acid with a detachable proton.

An electrolyte is optionally a solid electrolyte that may be used alone or in conjunction with a separator. Illustrative examples of solid alkali ion conducting materials include metal super ion conducting materials, where Me is Na, K, or Li such as those described in U.S. Pat. No. 8,012,621. Other examples include a perovskite oxide separator as disclosed in U.S. Patent Application Publication No: 2012/0183835.

A battery optionally includes one or more separators between an anode and a cathode. A separator may be saturated with a liquid electrolyte material, or may be substantially non-porous as long as it is sufficiently conductive to ions necessary for battery function. Traditional separators include separators in forms such as fibers in woven or felt-like form consisting of various materials, such as glass, cellulosic polymers, vinyl polymers, polyolefins or polyamides, for example. A separator is optionally a non-woven, felted, nylon, or polypropylene material that is permeable to hydroxide ions and may be suitably saturated with electrolyte.

A pouch-cell battery optionally includes a battery protection circuit. A battery protection circuit is an electronic control device that is capable, alone or in combination with other devices, of measuring battery voltage, measuring temperature, and optionally recording state of charge for each cycle. It is appreciated that a battery protection circuit is integral with the battery in that it is in direct line with the battery current collectors and is not, in some aspects, associated with a device powered by the battery or for charging the battery. In this way, the battery is capable of powering or being charged by a variety of devices without the need for individual battery charge control design or incorporation. Examples of battery protection circuits include the LM3641 made by TI Instrument Inc. and S8232 by Seiko Instrument Inc.

A battery protection circuit is optionally capable of measuring the rate of change of battery voltage (dV/dt) with respect to time (dV/dt). Such systems are common and commercially available in the art. Examples are MAX712 and MAX713 from Maxim Integrated Inc. including dV/dt slope-sensing charge-termination algorithms and MC68HC908JL3 from Freescale Semiconductor Inc. A voltage drop (−dV) method of end-of-charge detection is employed by the electronics that detects end of charge as any variation in the voltage level during charging due to the capacity of the battery. As such, a battery protection circuit includes a dV/dt detector that measures the rate of change of the battery voltage with time. If it is found to be rising at or above a predetermined rate or level or is found to be flattening out as in the case of reaching peak charge for a NiMH battery, a dV/dt flag will be set. This is also an indication that end of charge is approaching or has been reached. Upon reaching near to the end-of-charge point (~90% capacity point), the battery voltage rises before levelling off at its peak and later dips (in the case of an nickel cadmium battery) or flattens out (in the case of an nickel metal hydride battery). The point where the peal levels off or dips is the battery maximum state of charge.

In some aspects, a battery protection circuit includes a zero volt detector (zero dV/dt). The zero dV/dt detector measures the slope of the battery voltage until a flat slope is detected within a certain time frame as a battery maximum state of charge. This flat slope indicates that the peak voltage of the battery has been reached and can be used as an end-of-charge indication, particularly for a nickel metal hydride battery that may not exhibit any pronounced voltage dip in its fully charged state.

In some aspects, battery temperature is measured with respect to time (dT/dt). If this rate exceeds a certain limit, a dT/dt flag will be set, indicating a fast rising cell temperature, which is normally the case just before the end-of-charge of the battery. A standard thermistor is used as a portion of a battery protection circuit to measure battery temperature optionally before, during, and following charge.

The dV/dt flag or dT/dt flag is optionally an indication that charging is to be terminated so as not to exceed 90% of full charge, optionally 85% of full charge, optionally 80% of full charge.

Illustrative examples of systems and methods for measuring voltage or temperature changes over time can be found in U.S. Pat. Nos. 5,489,836, 5,998,966, 5,773,956, and 6,707,273.

In some aspects, a battery protection circuit includes a current detector for detecting current of charge or discharge. Outputs from the current detector can be used to calculate and determine the state of charge.

In some aspects, a battery protection circuit includes a portion for tracking state of charge (SOC) by recording the use (current and duration) of the cell. End of charge can be determined by the combination of temperature and voltage and used to calibrate the capacity of the cell, which is important for the determination of SOC. The current detector, the dV/dt detector, zero dV/dt detector, or the dT/dt detector can be used to measure or calculate the battery state of charge. Methods of determining SOC can be found in U.S. Pat. No. 6,522,148.

In some aspects, a battery protection circuit will adjust or terminate the charge rate or discharge rate of the battery depending on the current battery state of charge or other desired parameter. For example, should the battery reach a charging maximum SOC, the battery protection circuit optionally terminates charging or adjusts the charging rate to a "trickle" value to either maintain the maximum charging SOC in the battery or to drive the charging to the maximum charging SOC, or both. Trickle charge rates are optionally terminated after certain trickle charging time or are maintained indefinitely. Circuits and methods for adjusting charge rate can be found for example in U.S. Pat. No. 5,489,836.

In some aspects, charging is terminated upon reaching a charging maximum SOC that is less than 90% of the battery maximum. Battery maximum SOC is optionally determined for a particular battery type, style, size, composition, or other parameter. A battery protection circuit optionally stores a maximum value of SOC for the particular battery associated with the battery protection circuit and compares a present SOC for the battery during charging against the pre-determined SOC. When a charging maximum SOC is reached, the battery protection circuit terminates the charging process. A charging maximum SOC is optionally at or less than 90% battery maximum SOC, optionally at or less than 85%, 80%, 75%, or 70% battery maximum SOC. The inventors have discovered that terminating battery charging at 90% battery maximum SOC, atmospheric pressure remains low in the system thereby preventing the battery from exceeding a maximum internal atmospheric pressure and allowing the function of an alkaline pouch-cell battery.

Figure 2:
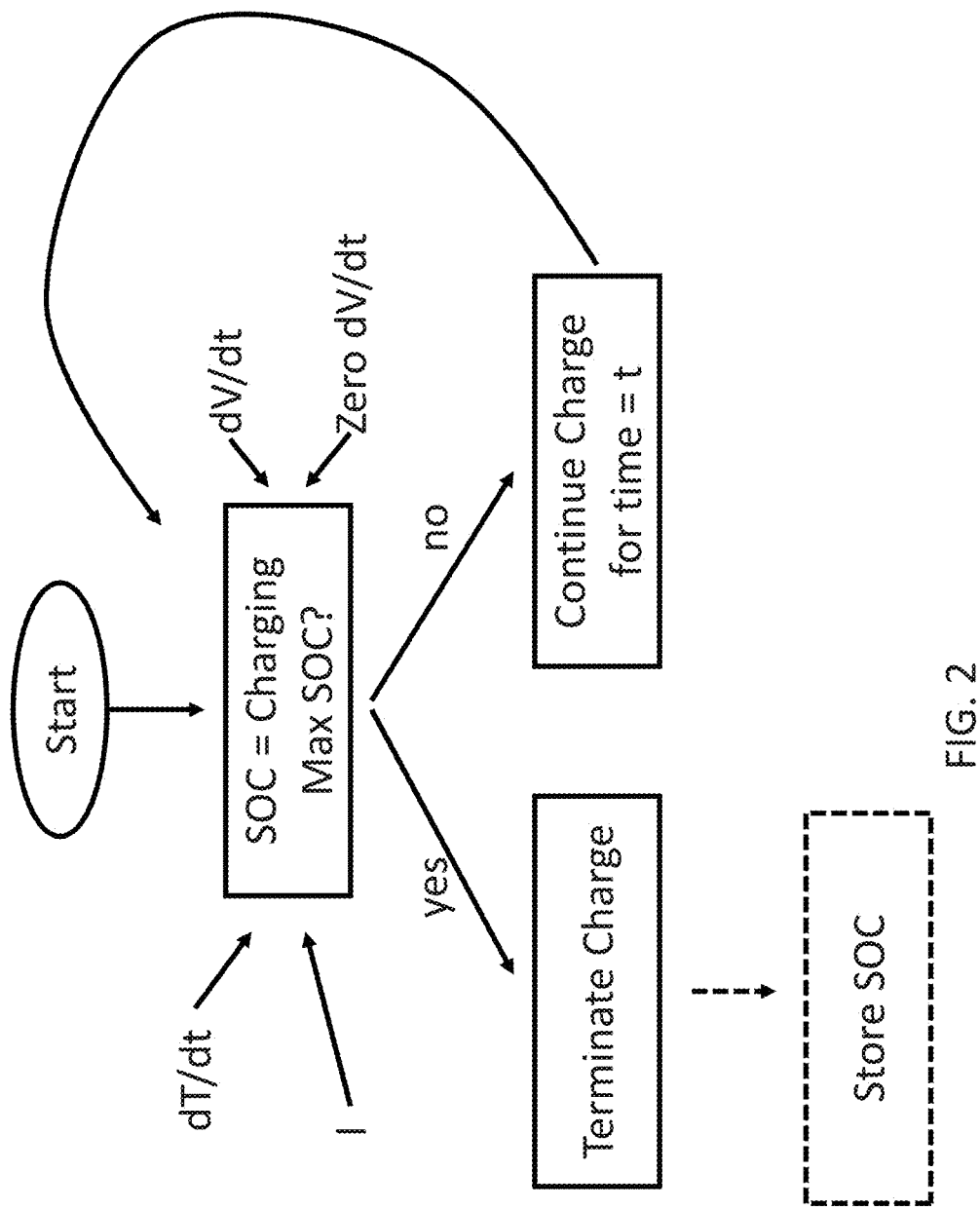
FIG. 2 illustrates one aspect of monitoring battery charging so as not to exceed a charging maximum state of charge.

FIG. 2 illustrates a flow chart of one aspect of battery charging using measured and battery maximum SOC to terminate battery charging at the appropriate SOC. The SOC detector receives inputs from one of many possible sources including a current detector (I), a dV/dt detector, a zero dV/dt detector, or a dT/dt detector and calculates the current SOC of the battery. If the current battery SOC is at or above the charging maximum SOC, the charging process is terminated and the SOC is stored in the memory device. If the current battery SOC is below a charging maximum SOC, the charging process continues for a time (t) after which the current battery SOC is once again determined. The time between detections of current battery SOC may be set by a user or may be constant and integral to the battery protection circuit. The time t may be any value from 1 ms to 10 seconds or more. In some aspects, current battery SOC is continuously determined where the time t is reduced to zero.

By terminating battery charging at a charging maximum SOC, internal atmospheric pressure inside the housing will be maintained at or below a target thereby preventing unwanted battery expansion or failure.

Various aspects of the present invention are illustrated by the following non-limiting examples. The examples are for illustrative purposes and are not a limitation on any practice of the present invention. It will be understood that variations and modifications can be made without departing from the spirit and scope of the invention.

EXPERIMENTAL

Example 1

An exemplary alkaline pouch-cell battery was constructed using electrodes with electrode dimensions of 2 cm×2 cm. The positive electrode was formed of 80% $Ni(OH)_2$ and 20% graphite-PTFE mixture (TAB 2) formed as a dry mixture and layered onto a nickel screen an electrode substrate. The negative electrode was an $AB_5$ type alloy including as designed in atomic percentages of La (10.5), Ce (4.3), Pr (0.5), Nd (1.4) Ni (60.0), Co (12.7), Mn (5.9), and Al (4.7). Methods of formation and testing of the negative electrode material is described in Young, et al., *J. Alloys Cpds*, 2014; 585:760-770. The negative electrode active material is formed by combining the raw materials and subjecting the raw ingots to induction melting in an argon atmosphere in a MgO crucible. The ingots were annealed at in vacuum ($1\times10^{-8}$ torr) at 960° C. for 10 h. The negative electrode material was analyzed for gaseous phase hydrogen storage characteristics using a Suzuki-Shokan multi-channel pressure-concentration-temperature (PCT) system. In the PCT analysis each sample was first activated by a 2 hour thermal cycle ranging between 300° C. and room temperature at 25 atm $H_2$ pressure. The PCT isotherms at 30° C. were then measured. The resulting material had a midpoint PCT plateau of approximately 0.8 atm.

The anode active material is compacted onto a nickel screen substrate with a 10-ton press to form the negative working electrode, approximately 0.2 mm in thickness, without any binder. A pre-taped 4 mm-wide nickel tab purchased from MTI (Richmond, Calif.) is welded onto each electrode. The tape is an adhesive polymer composed of three-layer-laminated enhanced sulfurized polymer resin. A piece of grafted polypropylene/polyethylene separator is folded in half and hot-sealed with a plastic bag sealer on three edges to form a separator pocket. The negative electrode is placed in the separator pocket while the positive electrode is placed on the outside of the pocket and directly on top of the negative electrode. Nickel tabs of both electrodes are on the same side of the electrode assembly.

Laminated pouch material formed of (from outside to inside) polyamide, polyester-polyurethane adhesive, aluminum foil, urethane-free adhesive, and polypropylene (MTI, Richmond, Calif.; model number: EQ-PLiB-302025) is folded and wrapped around the electrode assembly leaving the nickel tabs on the outside of the folded pouch. The position of the electrode assembly is adjusted so that the pre-taped sections on the tabs are near the edge of the pouch. The pouch is trimmed as necessary to accommodate possible gassing. The edge with the pre-taped areas of the pouch is sealed with a pouch heating sealer first followed by heat-sealing of two other pouch edges. An aqueous solution of 30% KOH is prepared as the electrolyte and injected into the pouch from the remaining open edge. The open edge is then heat-sealed to form the pouch-cell battery.

The as formed pouch-cell battery has the following characteristics as illustrated in Table 1.

TABLE 1

| Positive Electrode (P) | Weight (g) | Negative Electrode (N) | Weight (g) | Cell Assembly | Weight (g) |
|---|---|---|---|---|---|
| Active Material | 0.4429 | Active Material | 0.3847 | Separator | 0.02 |
| Binder/Additives | 0.1107 | Binder/Additives | 0 | Ni Tab | 0.02 |
| Ni Foam/Screen | 0.1 | Ni Foam/Screen | 0.0621 | Electrolyte | 0.2 |
| Total (A) | 0.6536 | Total (B) | 0.4468 | Total (C) | 0.5262 |
| Full Cell Total Weight (g) (A + B + C) | 1.6266 | | | | |

The specific capacity of the positive electrode is 240 mAh/g. The overall theoretical cell capacity is 106.296 mAh. This produces an energy density of 78.42 Wh/kg.

Figure 3A:
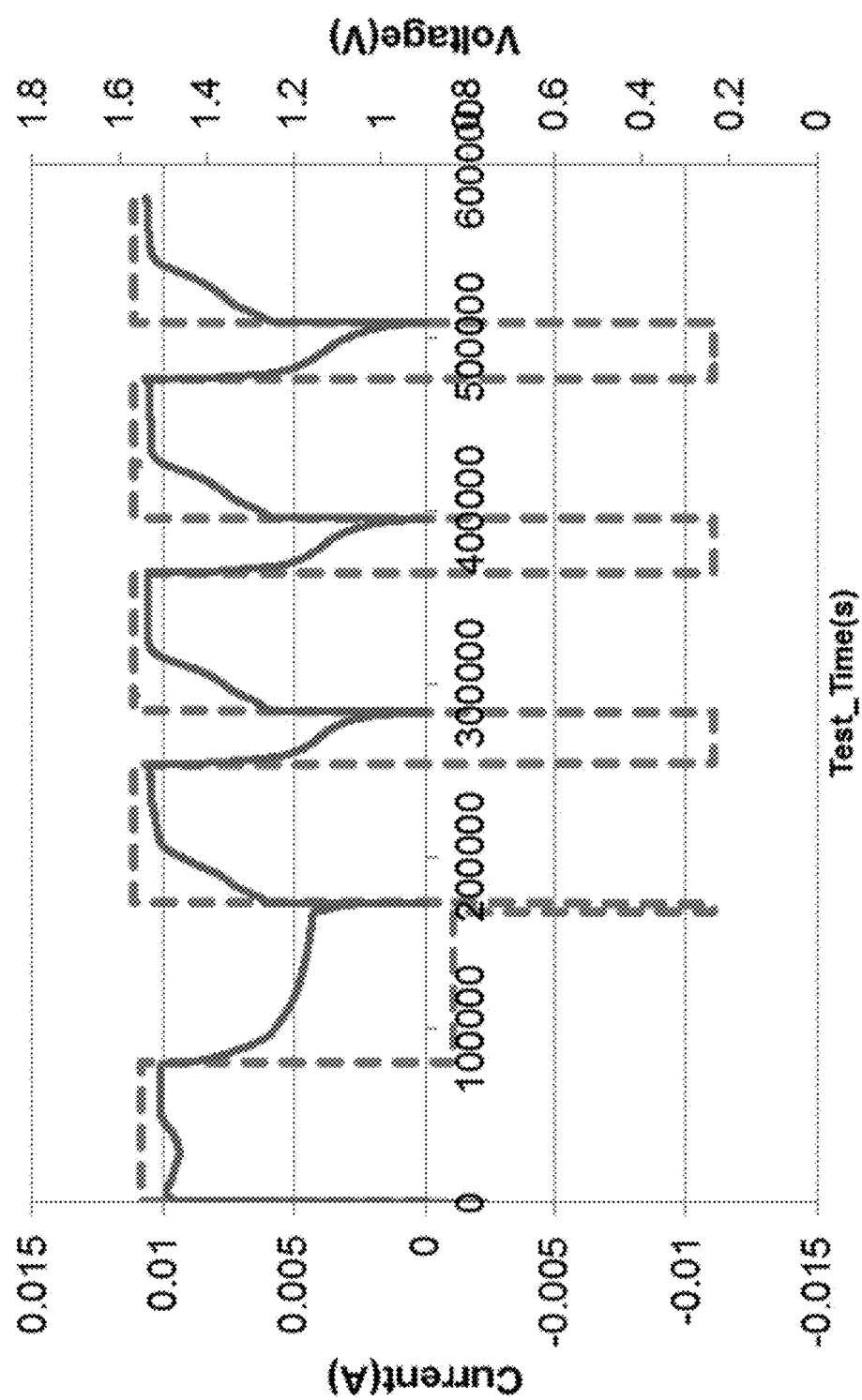
FIG. 3A illustrates charge/discharge characteristics of an exemplary alkaline pouch-cell secondary battery illustrating the charge current as a function of time (dashed line, left Y-axis) and the resulting cell voltage as a function of time (solid line, right Y-axis)
Figure 3B:
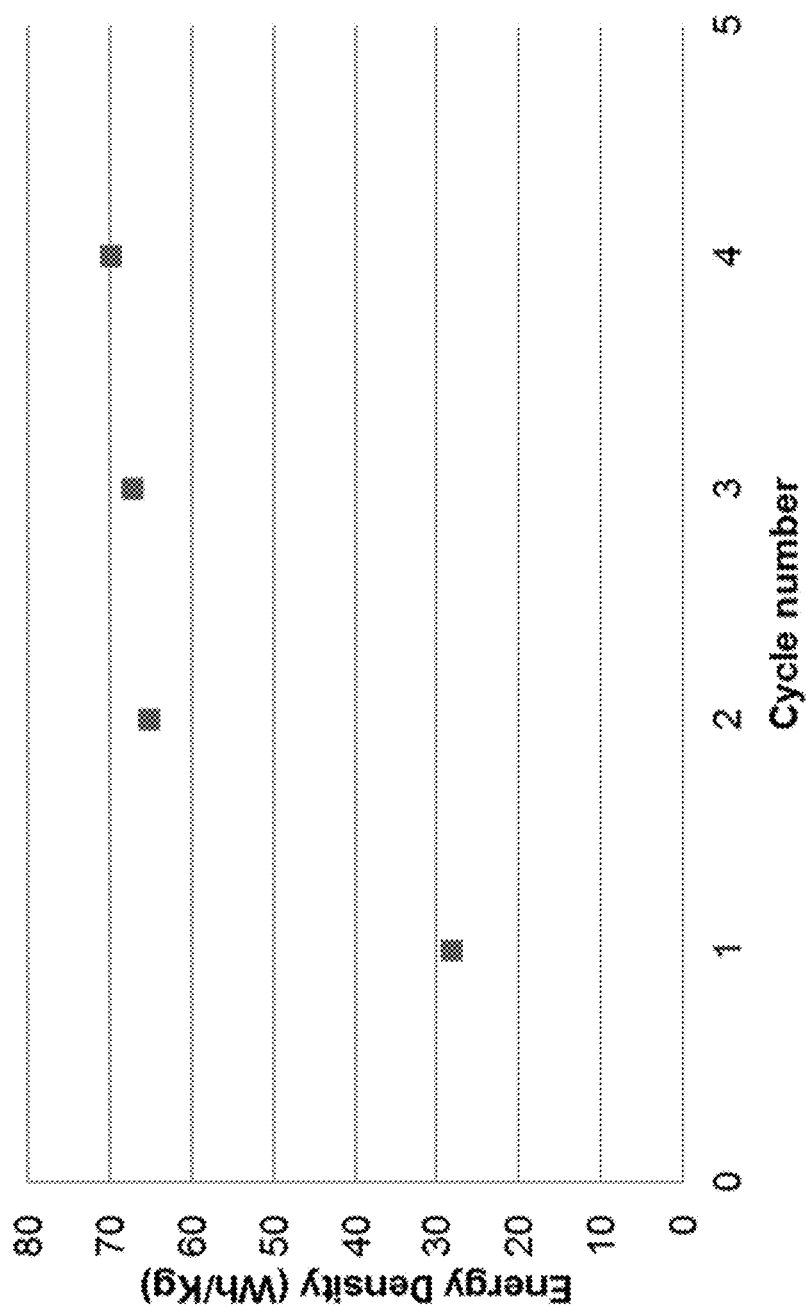
FIG. 3B illustrates the measured energy density of an exemplary alkaline pouch-cell secondary battery over four cycles.

The cell is subjected to a series of charge/discharge cycles using a charge/discharge rate of 25 mA/g. The resulting cell voltage is measured and plotted against test time as illustrated in FIG. 3A. The energy density is then calculated as the discharge capacity*average discharge voltage/total cell weight. The measured energy density is plotted on FIG. 3B. The measured energy density beginning at cycle 2 agrees well with the calculated energy density.

Example 2

A secondary alkaline pouch-cell is formed as in Example 1 using a second set of electrode active material types. The pasted positive electrode is composed of active material of $N_{83}Co_{12}Zn_5(OH)_2$ and additives of 5% Co, 6% $Co(OH)_2$, and 3% PVA on nickel foam substrate with thickness of approximately 0.7 mm. The negative electrode was about 70 mg of $La_{10.0}Ce_{5.0}Ni_{68.7}Co_{4.7}Mn_{4.3}Al_{5.6}Cu_{1.2}Zr_{0.2}Si_{0.3}$ metal hydride alloy powder prepared by induction melting as per Example 1 and compacted onto an expanded nickel substrate with a 10-ton press to form the negative working electrode, approximately 0.2 mm in thickness, without any binder. The plateau pressure of this alloy is 0.61 atm. The resulting N/P ratio of 1.2 was used to calculate the amount of positive active material is used against the negative electrode active material. The resulting positive and negative electrodes were assembled into pouch-cell configurations as was done in Example 1. The capacity obtained in the first seven cycles in mAh are listed in Table 2.

TABLE 2

| Cycle # | 1 | 2 | 3 | 4 | 5 | 6 | 7 |
|---|---|---|---|---|---|---|---|
| Cell 1 | 0.3 | 8.7 | 11.0 | 7.9 | 11.5 | 13.5 | 13.4 |
| Cell 2 | 0.3 | 8.4 | 11.0 | 7.8 | 11.5 | 14.4 | 15.9 |

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

In view of the foregoing, it is to be understood that other modifications and variations of the present invention may be implemented. The foregoing drawings, discussion, and description are illustrative of some specific embodiments of the invention but are not meant to be limitations upon the practice thereof. It is the following claims, including all equivalents, which define the scope of the invention.

The invention claimed is:

1. A sealed pouch-cell battery comprising:
   a flexible housing in the form of a sealed pouch, said flexible housing absent a safety vent;
   a cathode comprising a cathode active material capable of reversibly absorbing a hydrogen ion;
   an anode comprising metal hydride anode active material capable of reversibly absorbing a hydrogen ion, wherein said metal hydride anode active material has a pressure-concentration-temperature (PCT) plateau pressure of 0.8 atmospheres or less measured at 50% of the maximum storage capacity;
   a proton or hydroxyl ion conducting electrolyte; and
   said cathode, anode, and electrolyte housed within said pouch wherein said electrolyte is in chemical contact with both said cathode and said anode active material.

2. The battery of claim 1 further comprising a battery protection circuit capable of measuring the rate of change of battery voltage with respect to time, battery temperature, or both;
   said battery protection circuit in electrical connection to said cathode and said anode.

3. The battery of claim 2 wherein said battery protection circuit further comprises a memory device capable of recording state of charge for each charge cycle.

4. The battery of claim 2 wherein said battery protection circuit is capable of terminating the charge process when a charge state is equal to or greater than 90% state of charge.

5. The battery of claim 1 wherein said electrolyte is a polymer or solid separator/electrolyte.

6. The battery of claim 1 wherein said anode active material is a metal hydride alloy disordered material.

7. The battery of claim 6 wherein said disordered material is disordered both structurally and compositionally.

8. A sealed pouch-cell battery comprising:
   a flexible housing in the form of a sealed pouch, said pouch absent a safety vent;
   a cathode comprising a cathode active material capable of reversibly absorbing a hydrogen ion;
   a metal hydride anode comprising an anode active material capable of reversibly absorbing a hydrogen ion, said anode active material having a pressure-concentration-temperature (PCT) plateau pressure of 0.8 atmospheres or less measured at 50% of the maximum storage capacity;
   an electrolyte;
   said cathode, anode, and electrolyte housed within said pouch, said electrolyte in chemical contact with said anode and said cathode.

9. The battery in claim 8, further comprising a battery protection circuit capable of measuring the rate of change of battery voltage with respect to time, battery temperature, or both;
   said battery protection circuit in electrical contact with said cathode and said metal hydride anode.

10. The battery of claim 9 wherein said battery protection circuit further comprises a memory device capable of recording state of charge for each charge cycle.

11. The battery of claim 9 wherein said battery protection circuit is capable of terminating the charge process when a charge state is equal to or greater than 90% state of charge.

12. The battery of claim 8 wherein said battery is a secondary battery.

13. The battery of claim 8 wherein said housing has an average thickness between 0.02 and 0.2 millimeters.

* * * * *